United States Patent Office 2,702,267
Patented Feb. 15, 1955

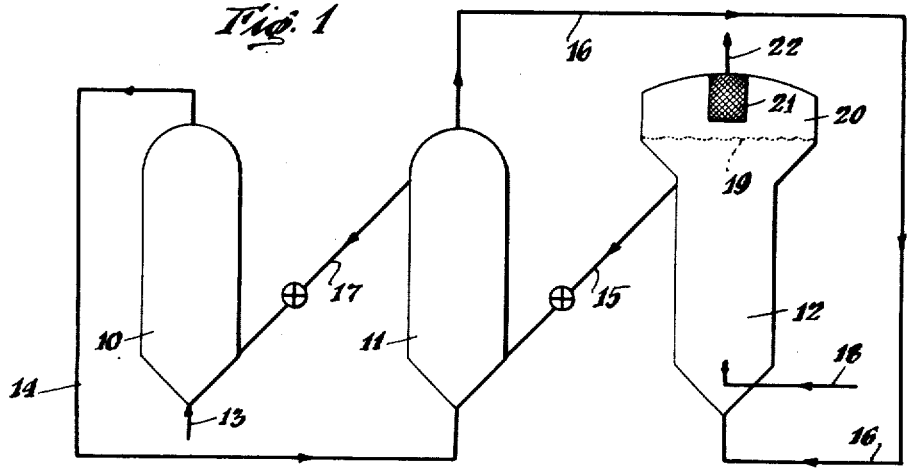
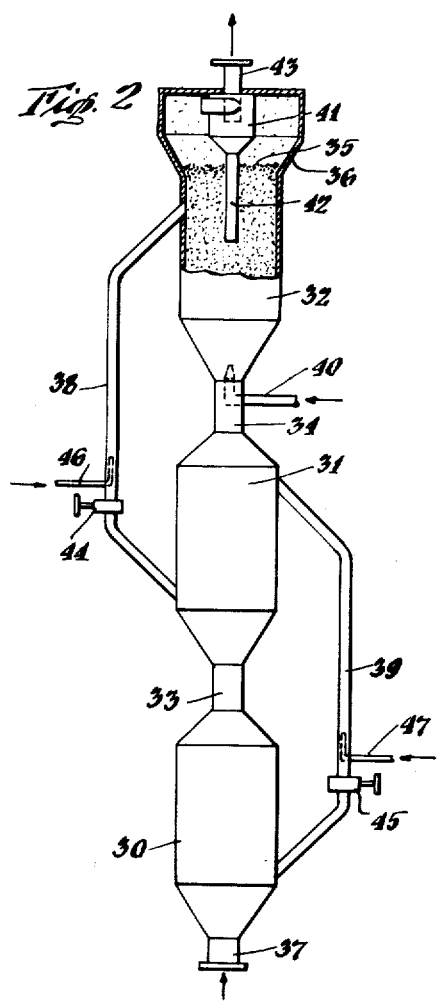
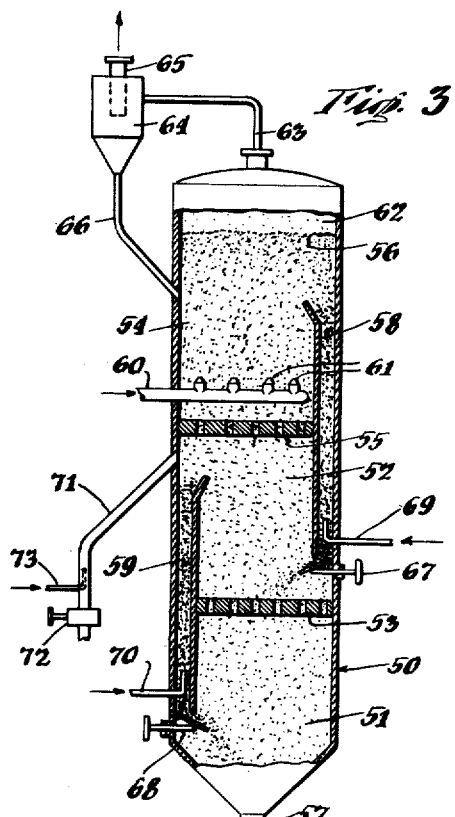

2,702,267

HYDROCARBON CONVERSION PROCESS AND THE STRIPPING OF THE FOULED CATALYST WITH REGENERATION GASES CONTAINING HYDROGEN

Percival C. Keith, Peapack, N. J., assignor to Hydrocarbon Research, Inc., New York, N. Y., a corporation of New Jersey Application April 27, 1951, Serial No. 223,205

16 Claims. (Cl. 196—52)

The present invention relates to the high-temperature conversion of hydrocarbons by contact with a comminuted solid material maintained in a fluidized state. The class of hydrocarbon conversions contemplated by the present invention involves the cyclic flow of the comminuted contact material through the hydrocarbon conversion zone and a regeneration zone wherein carbonaceous matter deposited on the contact material while in the conversion zone is removed from the contact material in the regeneration zone by reaction with an oxygen-containing re-generating gas. An important aspect of this invention is the stripping of absorbed (or adsorbed) hydrocarbons from fouled contact material as it progresses in its cyclic movement from the hydrocarbon conversion zone to the regeneration zone.

In recent years, the fluidization technique for effecting the conversion of hydrocarbons by contacting the vaporized hydrocarbons with a mass of finely divided contact material or catalyst at such velocities that the powdered solid becomes suspended in the vapors but exhibits what has been termed "hindered settling" has been developed extensively and is well known in the petroleum industry and other chemical processing industries. Fluidization characteristically keeps a mass of powdered material in a state of vibratory and random motion resembling a boiling liquid.

In the development of fluidized processes for the conversion of hydrocarbons, considerable attention has been devoted to the problem of effectively stripping hydrocarbons from the fouled or spent catalyst leaving the hydrocarbon conversion zone before it enters the regeneration zone. There are two good reasons for this concern: first absorbed hydrocarbons which reach the regeneration zone with the spent contact material are consumed by combustion and thus decrease the ultimate yield of hydrocarbons recovered from the conversion process and, second, hydrocarbons entering the regeneration zone with the spent contact material increase the load imposed on the regeneration zone and consequently raise the cost of regeneration. The problem of stripping hydrocarbons from spent catalyst or contact material is particularly acute in processes where a heavy hydrocarbon material like topped or reduced crude oil is the feed.

A principal object of this invention is the provision of an improved fluidized process for the conversion of hydrocarbons wherein the loss through combustion of hydrocarbons absorbed on fouled contact material is markedly curtailed.

Another important object is to render the conditions which are maintained in the conversion and regeneration zones, respectively, more independent of each other. Heretofore, as is well known to those skilled in the conversion of hydrocarbons by fluidized processes, the conditions maintained in the conversion and regeneration zones have been closely interrelated because these processes involved the maintenance of a desired catalyst-to-oil ratio.

These and other objects and advantages of the invention will be apparent from the description which follows.

To avoid verbiage, the term, catalyst, will be hereinafter used in lieu of contact material. It is, of course, known that various contact materials have different propensities or activities for facilitating the conversion of hydrocarbons at elevated temperatures. However, all contact materials in solid particle form as employed in the present invention have in common the function of presenting large surface areas to the hydrocarbons during their passage through the treatment or conversion zone. Accordingly, the term, catalyst, is herein used in its broadest sense to connote any particulate material presenting a large surface area to hydrocarbons undergoing conversion in order to facilitate the conversion and to hold the carbon formed during the conversion. Carbon itself, e. g., petroleum coke, is a suitable contact material for hydrocarbon conversions and comes within the term, catalyst, as used herein.

Simply and broadly stated, this invention comprises the establishment of a third fluidizing zone interposed in the usual fluidized catalyst system between the hydrocarbon conversion zone and the catalyst regeneration zone so that spent catalyst flows from the conversion zone into the third zone, hereinafter called the soaking zone, wherein it intermingles with regenerated catalyst coming from the regeneration zone. The resulting composite mixture of spent and regenerated catalyst particles within the soaking zone is maintained as a fluidized mass at a temperature intermediate the temperatures of the conversion and regeneration zones to promote and facilitate the stripping of absorbed hydrocarbons from the spent catalyst particles. To complete the cyclic movement of the catalyst in the system, a stream of the composite catalyst particles is passed from the soaking zone to the conversion zone while a similar stream flows from the soaking zone to the regeneration zone. In short, catalyst particles pass from the conversion and regeneration zones to the soaking zone where they become mixed and the mixed particles are recirculated from the soaking zone to the conversion zone and to the regeneration zone. The hot regeneration product gases leaving the regeneration zone serve as the fluidizing and stripping medium in the soaking zone. It is particularly advantageous to regenerate the spent catalyst particles with a mixture of steam and high-purity oxygen, i. e., oxygen containing not more than about 10% by volume of nitrogen or similar inert gas. More specifically, the high-purity oxygen may be the product of air liquefaction and rectification containing at least about 90% by volume of oxygen, preferably, at least about 95% by volume of oxygen. Using high-purity oxygen and steam as the regenerating medium and conducting the regeneration at a temperature above about 1400° F., preferably about 1600° F., the carbonaceous deposit is eliminated from the spent catalyst particles and the resulting regeneration product gases comprise substantial proportions of hydrogen and carbon oxides in addition to excess steam supplied to the regeneration zone.

When a mixture of steam and high-purity oxygen is used as the regenerating medium, the principal reactions by which the carbon deposit is eliminated from the catalyst particles include:

(A) $C + \tfrac{1}{2}O_2 = CO$
(B) $C + O_2 = CO_2$
(C) $C + CO_2 = 2CO$
(D) $C + H_2O = CO + H_2$ Another important reaction which takes place is the water-gas shift reaction:

(E) $CO + H_2O = CO_2 + H_2$

Reactions A, B and E are exothermic while reactions C and D are endothermic. Reactions D and E produce the hydrogen employed by this invention in improving the soaking step and even the hydrocarbon conversion step. The regenerating gas usually contains more steam or water vapor than oxygen to ensure a high yield of hydrogen. Depending upon the catalyst particles and the materials of construction of the reactor, it is sometimes necessary to use large excesses of steam, say steam-to-oxygen volume ratios of 3:1 and higher, in order to lower the reaction temperature and thereby avoid fusion or other injury to the catalyst or reactor.

Refractory materials like zirconia from which the catalyst particles and reactor lining can be made to withstand elevated temperatures ranging up to about 3000° F. are fairly expensive and, therefore, it is frequently advisable to choose from the cheaper refractories which usually can withstand temperatures not exceeding about 2500° F. Steam-to-oxygen ratios in the range of about 1.5:1 to 4:1 are generally satisfactory for maintaining the regeneration temperature in the desirable range of about 1600° to 2500° F. In short, it is advisable to conduct the regeneration at temperatures approaching the maximum temperature permissible with the chosen catalyst particles and reactor materials, and this means in turn, that the regenerating gas should have the smallest steam-to-oxygen ratio which will afford the necessary temperature control. In most instances, regeneration is carried out at temperatures in the range of substantially 1600° to 2500° F. with regenerating gases having steam-to-oxygen ratios in the range of substantially 1.5:1 to 4:1.

To enhance the beneficial influence of regeneration product gases containing a material proportion of hydrogen, it is advisable to maintain the temperature in the soaking zone at least about 100° F., preferably about 150° F., higher than the temperature maintained in the conversion zone. Under these conditions, heavy hydrocarbons absorbed on spent catalyst particles are more readily cracked and volatilized within the soaking zone with the result that the recovery of the absorbed hydrocarbons entering the soaking zone is increased.

Since one of the principal objectives of the invention is to process heavy oils economically, it is highly desirable to effect the conversion of the heavy oil molecules in the presence of a substantial partial pressure of hydrogen which suppresses the formation of carbon. In such cases, the partial pressure of the hydrogen within the hydrocarbon conversion zone is generally at least about 75 p. s. i. (pounds per square inch) and preferably at least about 100 p. s. i. To obtain the desired hydrogen partial pressure in the conversion zone, it is advisable to maintain the whole reaction system at a pressure in the range of about 200 to 800 p. s. i. g. (pounds per square inch gauge), preferably in the range of about 300 to 650 p. s. i. g.

The temperature maintained in the hydrocarbon conversion zone will vary with the particular type of feed material and catalyst but in most instances will fall in the range of about 800° to 1100° F. Optimum conversion results are generally obtained at temperatures in the range of about 900° to 1000° F.

It is highly desirable to preheat all of the reactants entering the reaction system to the highest practical temperatures approaching the respective reaction temperatures of these reactants. For instance, when the regeneration zone is operated at temperatures of not less than about 1400° F., the regenerating gas is usually charged at temperatures in the vicinity of 1000° F.; specifically, steam may be supplied at a temperature of about 900° to 1100° F. along with high-purity oxygen preheated to a temperature of about 400° to 800° F. With the conversion zone operating at temperatures of not less than about 800° F., it is advisable to preheat the hydrocarbon stream to a temperature as close to the conversion temperature as is possible without causing coking or other hydrocarbon degradation in the preheater. Most hydrocarbon feed stocks can be safely preheated to temperatures in the range of about 600° to 750° F.

The catalyst employed in the process of this invention may be selected from any of the several broad classes of catalysts conventionally used in cracking, reforming, isomerization, cyclization, desulfurization, dehydrogenation and similar conversions of hydrocarbons at elevated temperatures. Where the regeneration temperature is of the order of 1400° F. and higher, it is clear that the catalyst or contact material should be selected on the basis of its ability to withstand the desired regeneration conditions without physically disintegrating or fusing. Suitable contact materials for regeneration temperatures exceeding 1400° F. include quartz chips, alumina, magnesia, zircon, beryl, bauxite and coke.

For a clearer and more detailed understanding of this invention, reference is now made to the drawings forming a part of the specification and showing exemplary embodiments. These illustrations are not to be interpreted in a restrictive sense.

Figure 1 diagrammatically shows a fluidized catalyst system with a soaking zone 11 interposed between the regeneration zone 10 and the hydrocarbon conversion zone 12. Regeneration of spent catalyst particles is carried out under fluidizing conditions in zone 10 with a regenerating medium, preferably a mixture of steam and high-purity oxygen, entering by way of line 13. Vessel 10 is operated completely filled with fluidized catalyst so that regenerated catalyst flows out of vessel 10 together with the regeneration product gases. These hot product gases and suspended catalyst particles pass through line 14 into soaking zone 11 wherein they meet and intermingle with spent catalyst particles discharging from conversion zone 12 through valved line 15. The resulting fluidized composite of regenerated and spent catalyst particles attains a temperature in the soaking zone intermediate the temperatures maintained in the regeneration and conversion zones. Vessel 11 is also operated full with fluidized material so that the regeneration product gases along with hydrocarbon vapors stripped from spent catalyst particles flow through line 16 and entrain composite catalyst to the hydrocarbon conversion vessel 12. Simultaneously, a portion of the composite spent and regenerated catalyst in soaking zone 11 discharges by way of valved line 17 into the regenerator 10 to complete the cyclic flow of catalyst from regenerator 10 to soaker 11 and back again to regenerator 10. The hydrocarbon feed is injected into the converter 12 through line 18 wherein it contacts the fluidized catalyst, preferably in the presence of hydrogen produced in regenerator 10 and forming part of the gases flowing from regenerator 10 to and through soaker 11 and thence into converter 12. The converted hydrocarbon vapors along with regeneration product gases and hydrocarbons stripped from spent catalyst in soaking zone 11 become disengaged from the bulk of the fluidized catalyst in converter 12 in the region of its pseudo-liquid level 19. Any catalyst particles which remain entrained in the gasiform effluent as it passes through the enlarged settling section 20 of vessel 12 are removed by filter 21 to avoid the loss of catalyst from the system. The filtered gasiform effluent flows through line 22 to conventional equipment which separates the hydrocarbons in the form of desired boiling-range fractions from the normally gaseous components of the effluent. Where the regeneration has been conducted with steam and high-purity oxygen under conditions yielding hydrogen and carbon monoxide, the normally gaseous residue from the effluent after the liquid hydrocarbons have been recovered therefrom is particularly valuable as a fuel gas or a reactant gas in chemical processes. The cyclic flow of catalyst between soaking zone 11 and conversion zone 12 takes place through lines 15 and 16, as already mentioned.

Figure 2 represents a fluidized catalyst system in which three vessels 30, 31 and 32 are in superimposed relation and connected together by short ducts 33 and 34. A mass of fluidized catalyst completely fills the system from the bottom of regeneration vessel 30 to the pseudo-liquid level 35 in the upper expanded section 36 of the hydrocarbon conversion vessel 32. The regenerating gaseous medium enters regenerator 30 through inlet pipe 37. The resulting regeneration product gases and suspended regenerated catalyst particles flow from regenerator 30 through duct 33 into soaking vessel 31 wherein they intermingle with spent catalyst discharging from converter 32 by way of draw-off pipe 38. The spent catalyst particles entering soaking zone 31 and carrying absorbed hydrocarbons from conversion zone 32 undergo stripping during fluidization of these spent particles in admixture with hot regenerated catalyst particles entering soaking zone 31 by way of duct 33. A portion of the admixed, spent and regenerated catalyst particles is withdrawn from soaker 31 through draw-off pipe 39 and returned to regenerator 30 to complete the cyclic flow of catalyst between this vessel and upper soaking vessel 31. The regeneration product gases along with hydrocarbon vapors stripped from spent catalyst convey admixed catalyst particles from soaker 31 through duct 34 into hydrocarbon conversion zone 32. The hydrocarbon feed is injected into the fluidized catalyst in converter 32 through pipe 40. A gaseous effluent comprising the converted hydrocarbons, the hydrocarbons stripped from spent catalyst in soaker 31 and regeneration product gases from regenerator 30 becomes separated from the bulk of the fluidized catalyst at the pseudo-liquid level 35. Any catalyst particles which remain entrained in the gaseous effluent as it rises through the enlarged settling section 36 of conversion vessel 32 are separated from the effluent by a cyclone separator 41 and thence returned by standpipe 42 to the fluidized mass in converter 32. The gaseous effluent leaves the system through outlet pipe 43 whence it flows to a separation plant for the recovery of desired product fractions. As already indicated, the cyclic flow of catalyst between soaker 31 and converter 32 is up through duct 34 and down through pipe 38. Pipes 38 and 39 are provided, respectively, with slide valves 44 and 45 to regulate independently the rates of catalyst circulation between converter 32 and soaker 31 and between soaker 31 and regenerator 30. To ensure the ready flow of catalyst through pipes 38 and 39, fluidizing gas is admitted to these draw-off pipes through tubes 46 and 47, respectively. Steam, hydrogen and a gaseous fraction recovered from the effluent leaving the system through outlet pipe 43 are suitable fluidizing gases for injection through tubes 46 and 47 in order to prevent the clogging of catalyst in pipes 38 and 39, respectively. Because of the constrictions provided in the system by ducts 33 and 34 the upward flow of gas and suspended catalyst through these ducts is at a velocity at which substantially no back-flow of catalyst occurs through these ducts.

In accordance with this invention, soaker 31 attains a temperature which is higher than that maintained in converter 32 but lower than that in regenerator 30. The higher temperature of soaker 31 facilitates the stripping of hydrocarbons from spent catalyst particles and even promotes the cracking of absorbed hydrocarbons which are not amenable to stripping by straight volatilization. Thus the ultimate yield of hydrocarbon products is increased and the load imposed on regeneration zone 30 is decreased.

In Figure 3 the three zones of the system shown in Figure 2 have been incorporated in a single vessel 50. The lowermost regeneration zone 51 is separated from the intermediate soaking zone 52 by a foraminous member or perforated plate 53 and, in turn, soaking zone 52 is separated from the uppermost conversion zone 54 by perforated plate 55. A mass of fluidized catalyst with an upper pseudo-liquid level 56 fills the three zones in vessel 50. The regenerating gaseous medium enters regenerator 51 through inlet pipe 57 and the resulting regeneration product gases with entrained regenerated catalyst particles flow through constricted openings in plate 53 with substantially no back-flow of catalyst through these openings. The hot regeneration gases and particles of regenerated catalyst intermingle in the soaking zone with spent catalyst particles discharging from conversion zone 54 through duct 58. Under the influence of the higher temperature in soaker 52 and the regeneration product gases which act effectively as a stripping medium absorbed hydrocarbons are cracked and stripped from spent catalyst particles and conveyed with the regeneration product gases through perforated plate 55 into converter 54. The admixture of regenerated catalyst particles and spent catalyst particles, now stripped of absorbed hydrocarbons, is partly carried up into conversion zone 54 by the gases passing through perforated plate 55 and partly recycled to regenerator 51 through duct 59. The oil to be treated enters conversion zone 54 through pipe 60 provided with a plurality of nozzles 61. A gaseous effluent containing all of the gases and vapors entering vessel 50 becomes separated from the fluidized catalyst mass in the region of its pseudo-liquid level 56 and leaves the catalyst settling section 62 of vessel 50 through pipe 63. The gaseous effluent is purged of any entrained catalyst particles in cyclone separator 64 whence it flows by way of pipe 65 to a separation plant for the recovery of desired product fractions. Catalyst particles removed from the gaseous effluent in separator 64 are returned to the hydrocarbon conversion zone 54 through standpipe 66.

As in the previously described embodiments, soaker 52 is maintained at a temperature intermediate the temperatures in regenerator 51 and converter 54 by circulating the catalyst from this zone to each of the other two zones and from those zones back to the soaking zone. Specifically, catalyst flows from regenerator 51 up through perforated plate or grid 53 into soaker 52 and thence through duct 59 back to regenerator 51; also catalyst from soaker 52 flows upwardly through grid 55 into converter 54 and thence downwardly through duct 58 into soaker 52. Ducts 58 and 59 are provided, respectively, with adjustable closure means 67 and 68 at their lower extremities to regulate independently the rates of catalyst circulation between conversion zone 54 and soaking zone 52 and between soaking zone 52 and regeneration zone 51. Tubes 69 and 70 are used to inject a fluidizing medium into the lower portions of ducts 58 and 59, respectively, in order to prevent the stoppage of catalyst within these ducts.

Where a fluidized catalyst plant for the conversion of hydrocarbons is already in existence and comprises a regenerator and converter or cracker, the principles and advantages of this invention can in most cases be readily incorporated into the existing plant by adding a new soaking vessel and rearranging the piping between the existing regenerator and converter along the lines suggested by the flow diagram of Figure 1.

As a specific example of the invention, a residuum, obtained from the distillation of West Texas-New Mexico crude oil and having 7.5° API gravity, is treated in a reactor of the type shown in Figure 3. Vessel 50 has an inside diameter of 11 feet and an overall height of 75 feet. The comminuted contact material providing the fluidized mass in the three zones of vessel 50 is petroleum coke produced within the reaction system. The particle size of the comminuted coke is such that all of the coke passes through a 40-mesh screen and 50% by weight passes through a 100-mesh screen. The three zones of the reactor are at a pressure of 400 p. s. i. g.

With an oil charging rate of 10,000 barrels per day, oxygen of 95% by volume purity is supplied at the rate of 5.6 millions of cubic feet (standard conditions) per day together with 505,000 lbs. per day of steam as the regenerating gas (steam-to-oxygen ratio of 2:1). The oil is preheated to a temperature of 650° F., the oxygen to 430° F. and the steam to 950° F. The regenerating gas consumes coke in the lowermost regeneration zone which has a fluidized mass 25 feet in depth at the rate of about 166 tons per day. Coke is produced in the uppermost conversion zone at the rate of about 286 tons per day. While the excess coke could be consumed within the reactor by increasing the supply of regenerating gas and the excess heat generated thereby recovered from the reactor by heat transfer tubes or the like placed in the reactor for utilization elsewhere, for instance, in the generation of power, the illustrative plant is operated by withdrawing the excess coke from the reactor at the rate of 120 tons per day. The withdrawn coke is a valuable by-product. The excess coke is withdrawn from the intermediate soaking zone of reactor 50 (Fig. 3) through standpipe 71 and slide valve 72. Tube 73 provides a fluidizing medium to facilitate the discharge of the powdered coke from pipe 71.

The conversion zone with a fluidized mass 14 feet deep is maintained at a temperature of 980° F. by circulating coke between the conversion zone and the soaking zone at the rate of 540 tons per hour. The soaking zone with a fluidized mass 28 feet deep is maintained at a temperature of 1200° F. by circulating coke between the soaking zone and the regeneration zone at the rate of 215 tons per hour. The temperature in regeneration zone is 1800° F. The hydrogen produced in the regeneration zone yields a hydrogen partial pressure of 105 p. s. i. in the conversion zone.

From the total reaction effluent, there are recovered each day the following liquid products:

| | Barrels |
|---|---|
| Gasoline (C₄ and higher hydrocarbons boiling up to 400° F.) | 3700 |
| Gas oil (boiling 400° to 700° F.) | 2900 |
| Heavy distillate (boiling 700° F. and higher) | 2000 |
| Total liquid hydrocarbons | 8600 |

Ten percent by weight of the charged oil is recovered in the form of fuel gas.

In view of the various modifications of the invention which will occur to those skilled in the art upon consideration of the foregoing disclosure without departing from the spirit or scope thereof, only such limitations should be imposed as are indicated by the appended claims.

What is claimed is:

1. In the process for the conversion of hydrocarbons wherein the hydrocarbons contact a particulate catalyst in a conversion zone at an elevated conversion temperature and an oxygen-containing gas contacts said catalyst in a catalyst regeneration zone at a regeneration temperature higher than said conversion temperature to consume carbonaceous matter deposited on said catalyst by said hydrocarbons, the improvement which comprises maintaining a third zone at a temperature intermediate said conversion and regeneration temperatures, passing regenerated catalyst from said regeneration zone to said third zone and fouled catalyst with a deposit of carbonaceous matter and with absorbed hydrocarbons from said conversion zone to said third zone and effecting admixture of said regenerated catalyst and said fouled catalyst in said third zone, maintaining a regeneration temperature of at least 1600° F. in said regeneration zone and regenerating said catalyst in said regeneration zone in the presence of oxygen of at least 90% by volume purity and steam whereby to produce regeneration product gases containing a substantial proportion of hydrogen and carbon monoxide, flowing the regeneration product gases and steam from said regeneration zone through said third zone thereby stripping said absorbed hydrocarbons from said fouled catalyst, and passing admixed catalyst from said third zone to said regeneration zone.

2. The process of claim 1 wherein the third zone is maintained at a temperature at least about 100° F. higher than the elevated conversion temperature.

3. The process of converting hydrocarbons by contact with a fluidized catalyst, which comprises flowing the hydrocarbons in vapor form through the fluidized catalyst in a conversion zone maintained at an elevated conversion temperature, passing fouled catalyst with absorbed hydrocarbons from said conversion zone to a soaking zone maintained at a temperature above said conversion temperature, maintaining a regeneration temperature of at least 1600° F. in a regeneration zone and regenerating said catalyst in said regeneration zone in the presence of oxygen of at least 90% by volume purity and steam whereby to produce regeneration product gases containing a substantial proportion of hydrogen and carbon monoxide, fluidizing the catalyst in said soaking zone with said hot regeneration product gases flowing from said regeneration zone thereby stripping hydrocarbons from said fouled catalyst, passing fouled catalyst from said soaking zone to said regeneration zone wherein the catalyst is fluidized and regenerated by said oxygen of at least 90% by volume purity and steam, and passing catalyst from said regeneration zone to said soaking zone and from said soaking zone to said conversion zone while maintaining said soaking zone at a temperature intermediate said conversion temperature and said regeneration temperature.

4. The process of claim 3 wherein the molar ratio of steam to oxygen of at least 90% by volume purity is at least 1.5:1.

5. The process of claim 4 wherein the temperature in the regeneration zone is at least between 1600° and 2500° F.

6. The process of claim 3 wherein the conversion temperature is in the range of 800° to 1100° F. and the temperature in the soaking zone is at least about 150° F. higher than said conversion temperature.

7. The process of claim 3 wherein the regeneration product gases containing the stripped hydrocarbons flow from the soaking zone through the fluidized catalyst in the conversion zone.

8. In the fluidized catalyst process for the conversion of hydrocarbons wherein the hydrocarbons contact said fluidized catalyst in a conversion zone at an elevated conversion temperature and an oxygen-containing gas contacts said fluidized catalyst in a catalyst regeneration zone at a regeneration temperature higher than said conversion temperature to consume carbonaceous matter deposited on said catalyst by said hydrocarbons, the improvement which comprises maintaining a third fluidizing zone at a temperature intermediate said conversion and regeneration temperatures, circulating catalyst between said third zone and said conversion zone and between said third zone and said regeneration zone, maintaining a regeneration temperature of at least 1600° F. in said regeneration zone and regenerating said catalyst in said regeneration zone in the presence of oxygen of at least 90% by volume purity and steam whereby to produce regeneration product gases containing a substantial proportion of hydrogen and carbon monoxide, and flowing the regeneration product gases and steam from said regeneration zone through said third zone and thence through said conversion zone.

9. The process of claim 8 wherein the catalyst is petroleum coke.

10. The process of claim 9 wherein the hydrocarbons are of the type of topped petroleum crude oil.

11. The process of claim 8 wherein the catalyst is regenerated with oxygen of at least 90% by volume purity admixed with a greater volume of steam.

12. The process of claim 11 wherein the conversion, regeneration and third zones are maintained at a pressure of at least 200 p. s. i. g.

13. The process of claim 12 wherein the oxygen and steam are admixed in a steam-to-oxygen volume ratio of about 1.5:1 to 4:1.

14. In the fluidized catalyst process for the conversion of hydrocarbons wherein the hydrocarbons contact said fluidized catalyst in a conversion zone at an elevated conversion temperature and an oxygen-containing gas contacts said fluidized catalyst in a catalyst regeneration zone at a regeneration temperature higher than said conversion temperature to consume carbonaceous matter deposited on said catalyst by said hydrocarbons, the improvement which comprises maintaining a third fluidizing zone at a temperature intermediate said conversion and regeneration temperatures, said intermediate temperature being at least about 100° F. higher than said conversion temperature, circulating catalyst through the three said zones while ensuring that all fouled catalyst leaving said conversion zone first passes through said third zone before reaching said regeneration zone, maintaining a regeneration temperature of at least 1600° F. in said regeneration zone and regenerating said catalyst in said regeneration zone with oxygen of at least 90% by volume purity admixed with a greater volume of steam whereby to produce regeneration product gases containing a substantial proportion of hydrogen and carbon monoxide, flowing the regeneration product gases and steam from said regeneration zone through said third zone and thence through said conversion zone, and maintaining the three said zones at a pressure of at least 200 p. s. i. g.

15. The process of claim 14 wherein the hydrocarbons are the type of topped petroleum crude oil.

16. The process of claim 14 wherein oxygen and steam are admixed in a steam to oxygen ratio of about 1.5:1 to 4:1.

References Cited in the file of this patent

UNITED STATES PATENTS

| Number | Name | Date |
|---|---|---|
| 2,389,236 | Payne | Nov. 20, 1945 |
| 2,422,262 | Russel | June 17, 1947 |
| 2,450,753 | Guyer | Oct. 5, 1948 |
| 2,451,619 | Hengstebeck et al. | Oct. 19, 1948 |
| 2,465,255 | Moorman | Mar. 22, 1949 |
| 2,476,143 | Gullett | July 12, 1949 |
| 2,490,993 | Borcherding | Dec. 13, 1949 |

UNITED STATES PATENT OFFICE
CERTIFICATE OF CORRECTION

Patent No. 2,702,267  February 15, 1955

Percival C. Keith

It is hereby certified that error appears in the printed specification of the above numbered patent requiring correction and that the said Letters Patent should read as corrected below.

Column 7, line 46, strike out "at least".

Signed and sealed this 12th day of April 1955.

(SEAL)
Attest:
E. J. MURRY
Attesting Officer

ROBERT C. WATSON
Commissioner of Patents